United States Patent [19]

Kuhn et al.

[11] Patent Number: 4,877,294

[45] Date of Patent: Oct. 31, 1989

[54] ELECTRO-PNEUMATIC TRACTOR-TRAILER BRAKE SYSTEM

[75] Inventors: Lawrence H. Kuhn, New Haven; Michael B. Durant, Fort Wayne, both of Ind.

[73] Assignee: Navistar International Transportation Corp., Chicago, Ill.

[21] Appl. No.: 268,426

[22] Filed: Nov. 8, 1988

[51] Int. Cl.$^4$ .............................. B60T 13/68
[52] U.S. Cl. ................................ 303/9; 303/7; 335/170
[58] Field of Search ............... 303/6 M, 7, 9, 15, 71; 335/170

[56] References Cited

U.S. PATENT DOCUMENTS

| | | | |
|---|---|---|---|
| 3,058,781 | 10/1962 | Stair | 303/20 |
| 3,088,537 | 5/1963 | Le Tourneau | 180/328 |
| 3,396,352 | 8/1968 | Wilson | 335/170 |
| 3,653,783 | 4/1972 | Sauder | 417/298 |
| 3,840,276 | 10/1974 | Jubenville | 303/20 |
| 3,886,507 | 5/1975 | Johnston et al. | 335/170 X |
| 3,961,862 | 6/1976 | Edstrom et al. | 417/282 |
| 4,066,143 | 1/1978 | Umeda et al. | 180/329 |
| 4,076,327 | 2/1978 | Hubbard | 303/20 |
| 4,080,110 | 3/1978 | Szymaszek | 417/280 |
| 4,232,908 | 11/1980 | Stearns | 303/13 X |
| 4,459,085 | 7/1984 | Tonegawa | 417/282 |
| 4,483,409 | 11/1984 | Fun | 180/89.15 |
| 4,506,517 | 3/1985 | Pandzik | 62/175 |
| 4,568,129 | 2/1986 | Stumpe | 303/7 |
| 4,586,584 | 5/1986 | Auman et al. | 303/7 X |
| 4,697,852 | 10/1987 | Scholz | 303/7 |
| 4,749,238 | 6/1988 | Singleton et al. | 303/15 |
| 4,763,959 | 8/1988 | Vandemotter | 303/9 |

Primary Examiner—Duane A. Reger
Attorney, Agent, or Firm—F. David AuBuchon; Dennis K. Sullivan

[57] ABSTRACT

The spring-operated parking brakes of a tractor-trailer are controlled by a novel electro-pneumatic system. Pneumatic valving through which compressed air is conducted is mounted on the tractor chassis and coupled via an electronic circuit to two hand-operated control devices on the dash of the tractor cab, one for the trailer parking brakes only and the other for the tractor parking brakes. The latter device inherently operates the trailer parking brakes via the circuit if they are not already applied, and the circuit incorporates a sequencing function for operating the trailer brakes slightly before the tractor brakes when the tractor parking brake control is operated. Compressed air for the system is obtained via an engine-driven compressor which charges a tank. A pressure transducer monitors tank pressure for the circuit with the circuit maintaining tank pressure through selective loading and unloading of the compressor. Purging of the dryer is coordinated with compressor unloading. The pressure transducer also interacts with the parking brake control devices and the parking brakes such that when the pressure drops below a certain level, the parking brakes are automatically applied. The circuit also gives an alarm before the pressure reaches that level.

35 Claims, 5 Drawing Sheets

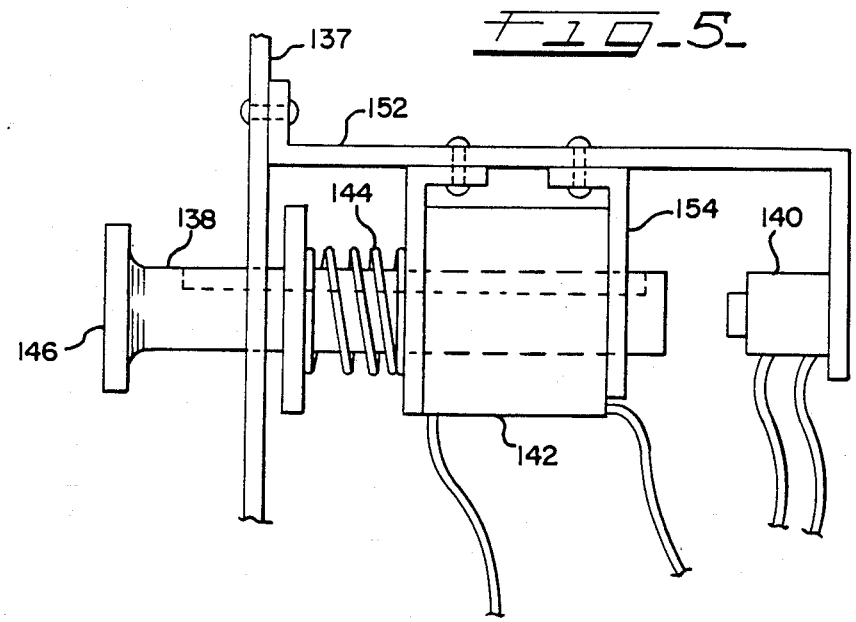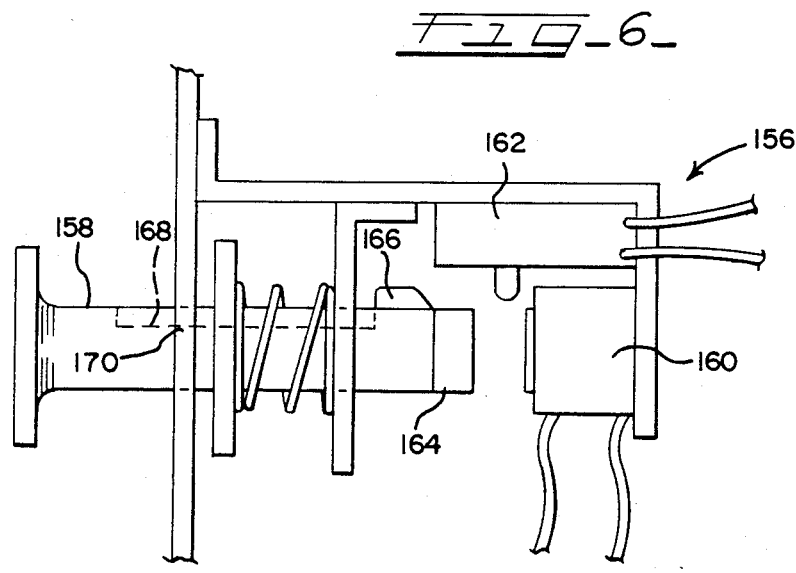

ELECTRO-PNEUMATIC TRACTOR-TRAILER BRAKE SYSTEM

BACKGROUND AND SUMMARY OF THE INVENTION

This invention relates to improvements in tractor-trailer pneumatic brake systems.

An important component of our national transportation system is the highway tractor. A substantial portion of manufactured goods and raw materials are transported over the nation's roads and highways in trailers which are hauled by highway tractors. A single highway tractor is capable of transporting a trailer having a load which can run into the order of many tons.

Pneumatically-operated brake systems have been adopted for such tractor-trailer combinations. Likewise, the "fifth wheel" has been adopted as the mechanical means by which a trailer connects to a tractor.

In a tractor-trailer combination, the trailer brakes must be placed under the control of the driver in the tractor. This is accomplished by appropriate pneumatic circuitry on the tractor which is connected via air lines with compatible pneumatic circuitry on the trailer when the trailer is mechanically connected to the tractor's fifth wheel for hauling. The pneumatic circuitry on the tractor contains various valves through which control over the tractor's and trailer's pneumatic brakes is exercised by the driver.

The tractor contains a pneumatic power supply which comprises an air compressor driven by the tractor's engine to draw and compress air into one or more tanks which form a reservoir or reservoirs of compressed air at suitable pressure for operating the pneumatic brakes of the tractor and those of a trailer when such a trailer is connected to the tractor for over-the-road hauling. The compressor is selectively loaded and unloaded in accordance with pressure conditions in the tank to maintain a certain pressure of compressed air in the tank or tanks. Such tanks are typically mounted on the chassis of the tractor, and pneumatic lines extend from such tanks to pneumatic valves located in the tractor cab for use by the driver in exercising control over the tractor's brakes and those of a trailer when connected to the tractor for hauling.

The service brake system of the tractor comprises a foot pedal operated pneumatic valve which the driver uses to apply the service brakes of the tractor's wheels and also those of a trailer when connected to the tractor. The tractor cab also contains a pneumatic trailer brake valve which the driver can operate by hand, enabling the driver to apply the trailer service brakes in a controlled manner independently of the tractor's service brakes. This trailer brake valve gives the driver certain control which can be important at certain times in the operation of the tractor-trailer combination.

Additionally, the tractor-trailer combination comprises parking brakes commonly of the type known as spring brakes. The spring brakes are not a substitute for the service brakes; rather they are intended to lock the wheels when the tractor-trailer combination is parked. When the tractor is disconnected from the trailer, the trailer's parking brakes are automatically applied to prevent trailer roll-away. When no trailer is connected to the tractor, the tractor parking brakes may also be applied by the driver to lock the tractor wheels. Controls for operating the parking brake systems are in the tractor cab for manual activation by the driver. The parking brakes of both tractor and trailer also are adapted for operation in response to certain conditions of the service brake system, such as when the pressure of compressed air in the tractor's compressed air storage tank or tanks drops below a certain threshold.

In the fully pneumatic air brake systems which are currently in use, pneumatic lines are routed into the tractor cab where the pneumatic brake controls are located. For convenience of the driver of the tractor, the tractor and the trailer parking brake controls are typically mounted on the dash, and it is therefore necessary to route pneumatic lines to this area of the cab.

One aspect of the present invention relates to a new and unique organization and arrangement of various component parts of a pneumatic-operated brake system of a tractor, both for the tractor per se and for the tractor-trailer combination. This novel organization and arrangement can contribute to reducing manufacturing and maintenance costs. Certain of the pneumatic components heretofore mounted inside the cab are disposed external to the cab on the tractor chassis. Control of the pneumatic brakes is accomplished through an electro-pneumatic system rather than a system which is strictly pneumatic. More compact electrical and electronic controls are mounted in the cab's dash and connected by electric wires to pneumatic hardware components which are mounted on the chassis external to the cab. This frees the space in the area of the dash and facilitates installation of the controls in the cab. The use of electric wires instead of air lines between the cab and the chassis also provides a simplification. The number of air line couplings is reduced, a significant cost saving, and the installation of electric wires is considerably easier than installing pneumatic air lines. Attributes of the invention are especially significant in cab-over type tractors where lines between the cab and the chassis must be routed through the pivot point of the cab on the chassis.

A still further advantage of the invention is that changes which may be required, such as by governmental regulation, can often be accomplished more efficiently and economically because it is often possible to make changes in electronics instead of in hardware, such as valves, lines, and couplings.

Further consequences of the improvements afforded by the invention are reduction in cab noise levels due to removal of certain pneumatic components from the cab, and a modest, but finite, reduction in vehicle curb weight.

Another aspect of the invention relates to the manner in which the air compressor is operated and the air dryer is purged of condensed moisture. The compressor is driven by the tractor's engine and it is loaded and unloaded in accordance with the level of pressurized air in the storage tank or tanks. Because of the inherent nature of the air compression process, moisture condenses in the compressed air and must be removed. Existing compressors include governors which control compressor loading and unloading in accordance with the level of air pressure sensed at the storage tank or tanks. A pneumatic line transmits the tank pressure to the compressor governor, and when the sensed pressure drops below a threshold, the compressor is loaded to the tank, drawing air and compressing it into the tank. When the tank pressure rises to a certain level, the compressor is once again unloaded, ceasing to compress air into the tank. This cycle periodically repeats in accordance with demand, serving to maintain tank pressure within a certain range.

In the previous design, purging of moisture from the pneumatic system is concurrent with unloaded operation of the compressor. Because a substantial proportion of the tractor's operating time comprises the compressor being unloaded, the dryer purge time is much greater than necessary to accomplish sufficient purging. During purging of the dryer, a low pressure path is created between the compressor intake port and atmosphere. In a tractor which has a turbo-charged engine the compressor may draw the boost air from the turbocharger. Consequently, when purging occurs, boost pressure may be lost through this low pressure path resulting in some attenuation of engine power; this may be manifested at times by the need for the driver to downshift in order to overcome such temporary power attenuations. The mechanical governor system for the air compressor may also require periodic maintenance which often includes the need for re-calibration.

A still further aspect of the invention relates to improvements in the compressor loading-unloading cycle and dryer purge cycle which can produce greater accuracies and consistencies than in mechanical-pneumatic systems, thereby making maintenance and re-calibration less frequent. Certain adjustments, when needed, can be accomplished in the electronics, rather than in hardware. The improvements are compatible in many instances with compressors and dryers currently in use so that the improvements can be incorporated without the necessity of completely re-tooling the system.

A still further aspect of the invention relates to improvements in the parking brake control system. As alluded to earlier, current systems use rather large, complicated pneumatic valves located in the dash area of the tractor cab. Requirements for sequencing and low-pressure cut-out have added to the complexity, cost, and size of components that must be placed in the dash, and there are increased interior noise levels due to the routing of air lines into t he cab. According to this further aspect of the invention, certain pneumatic circuit components are replaced by novel electromechanical control devices, and associated electronics, in the cab. These particular control devices are the parking brake controls for the tractor and the trailer. There are two such devices. One is for the trailer alone; the other is for the tractor, but it also interacts with a trailer when connected to the tractor such that the trailer parking brakes are operated if the driver operates the tractor parking brakes. The sequencing function of applying the trailer parking brakes just prior to the tractor's in embodied in the electronics. The devices are also interactive via the electronics with an electric pressure transducer which senses the level of air pressure in the tank or tanks such that if the sensed pressure drops below a certain threshold, the parking brakes are automatically applied. The electronics however also contains an alarm to alert the driver to this possibility before it occurs so that typically there will be time for the drive to initiate action himself before the parking brakes are applied. The pressure transducer signal is also used by the electronics in controlling the compressor loading-unloading and dryer purge functions.

The foregoing features, advantages, and benefits of the invention along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 5 is a side view of one of the components schematically shown in Fig. 1 illustrating more detail.

FIG. 6 is a view similar to FIG. 5 showing another embodiment.

DESCRIPTION OF THE PREFERRED EMBODIMENT

Figure 1:
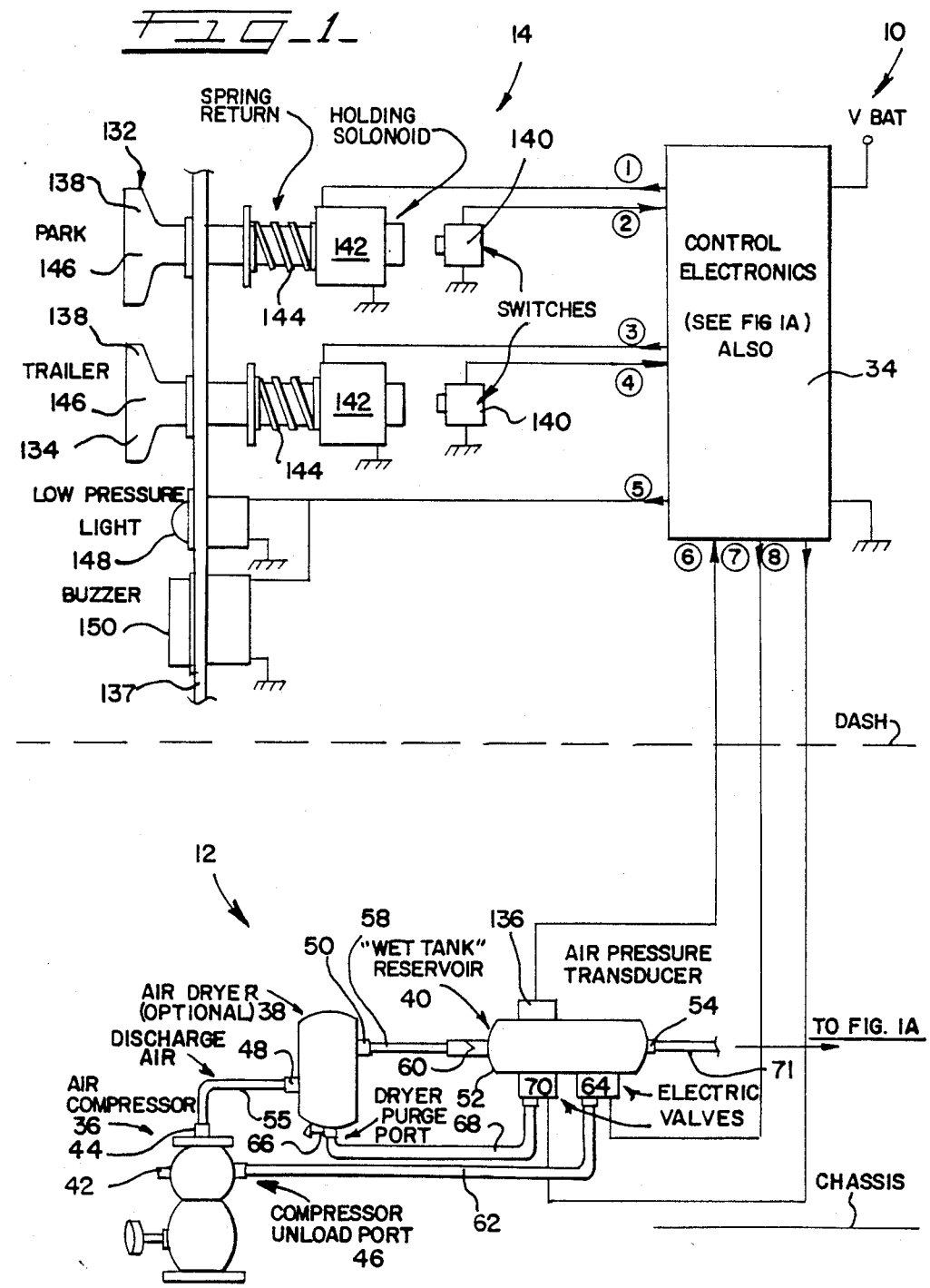
FIGS. 1 and IA taken together constitute a schematic diagram of a system embodying principles of the invention.

The overall organization and arrangement of an electro-pneumatic tractor-trailer brake system 10 according to the present invention is shown in FIGS. 1 and IA. For convenience in explanation, the system may be considered to comprise a pneumatic power supply 12 (FIG. 1), parking brake controls 14 (FIG. 1), service brake controls 16 (Fig. 1A), pneumatic circuits 18 and 20 respectively for conducting pressurized air to the tractor's service and parking brakes 22 and 24 respectively (Fig. IA), pneumatic circuits 26 and 28 respectively for conducting pressurized air to the trailer's service and parking brakes 30 and 32 respectively (Fig. 1A), and control electronics 34 (both FIGS.).

The tractor construction comprises a chassis and a cab. Road-engaging wheels are suspended from the chassis, and the chassis contains a powertrain for imparting automotive operation to the tractor. The driver is seated inside the cab which mounts on the chassis, and the dash, or instrument panel, inside the cab contains various controls. FIGS. 1 and 1A have been partitioned and labelled to indicate the locations of various components in the tractor.

The pneumatic power supply 12 is representative, comprising an air compressor 36, a dryer 38, and a "wet tank" reservoir 40. Compressor 36 is pulley-driven from the tractor's engine and comprises an inlet 42, an outlet 44, and an unloading port 46. Dryer 38 has an inlet 48 and an outlet 50, and tank 40 has an inlet 52 and an outlet 54. The compressor outlet 44 is connected by a pneumatic line 56 to the dryer inlet 48, and the dryer outlet 50 is connected by a pneumatic line 58, containing a check valve 60, to the tank inlet 52. Compressed air for the system is obtained from tank 40 at the tank outlet 54.

The compressor is operated to loaded and unloaded conditions via unloading port 46. A pneumatic control line 62 connects between tank 40 and unloading port 46. This control line contains an electric-actuated pneumatic valve 64 which is under the control of control electronics 34. When valve 64 is open, tank pressure is communicated to unloading port 46, and the application of tank pressure to the unloading port causes the compressor to operate in the unloaded condition. When valve 64 is closed, unloading port 46 is exhausted, causing the compressor to operate in the loaded condition. In the loaded condition, the compressor draws air via inlet 42, and compresses it into tank 40 via line 56, dryer 38, line 58, and check valve 60.

Dryer 38 has a pilot-operated purge port 66 via which condensed moisture which has been removed from the compressed air by the dryer is purged from the system. A pneumatic line 68 which contains an electric-actuated pneumatic valve 70 is connected between tank 40 and a pilot port associated with purge port 66. Valve 70 is under the control of control electronics 34. When valve 70 is open, compressed air is conducted to the purge port's associated pilot port causing the normally closed purge port to open and allow moisture to escape from the dryer. While this is happening, check valve 60 is preventing compressed air in tank 40 from escaping through the dryer. When valve 70 is closed, the pilot pressure is removed, causing the purge port to close thereby ending the purge cycle. As will become more apparent from the ensuing description, the control electronics exercises close control over the amount of purge time.

As mentioned above, the illustrated pneumatic power supply is representative. It is portrayed as having the tank outlet 54 connecting via a line 71 to additional tanks 72 and 74 which constitute primary and secondary supply tanks for a service brake system which is of the type comprising primary and secondary services brakes. The particular tank configuration and the particular service brake configuration do not constitute limitations on the generic aspects of the invention, and that is why the particular system which is illustrated is said to be representative.

The two tanks 72, 74 have respective outlets 76, 78 which connect to the two pneumatic circuits 18 and 20. Circuit 18 comprises primary and secondary branches 80, 82 which run from the chassis-mounted tanks 72, 74 to the cab-mounted pneumatic service brake valve 84; from valve 84 these two branches run back to the chassis and to the primary and secondary brakes for the tractor's wheels, such brakes being collectively identified by the assigned numeral 22.

The service brake controls 16 comprise a pneumatic trailer brake valve 86 in addition to service brake valve 84. Service brake valve 84 is foot-operated by the driver to operate the tractor service brakes 22. When a trailer is coupled for hauling to the tractor, the trailer's service brakes are slaved to the tractor's service brakes so that the trailer's service brakes operate in unison with the tractor's service brakes whenever service brake valve 84 is operated by the driver. When a trailer is coupled to the tractor, the service brakes of the trailer can be manually operated via valve 86 without causing the tractor's service brakes to be operated. This capability is important in certain driving situations, and valve 86 is typically mounted on the steering column of the tractor for manual operation by means of a lever.

In accordance with certain principles of the invention, the slaving of the tractor service brakes to the trailer's service brakes is accomplished via chassis-mounted pneumatic components. Such components are illustrated in FIG. 1A as a multi-port pneumatic valve 90 and a pair of separate electric-actuated pneumatic valves 92, 94. Valve 90 is a conventional valve used for coupling the pneumatic lines on a tractor with those on an attached trailer; it is commonly referred to as a TPV valve. However, rather than being mounted in the cab, as in a conventional strictly pneumatic system, valve 90 is chassis-mounted.

Valve 90 has three inlet ports 96, 98, 100, each of which has an associated check valve 102, 104, 106. It also has two outlet ports 108, 110 and a control port 112. Ports 96 and 98 are connected through their respective checks with the two branches 82, 80 respectively of circuit 18 returning from service brake valve 84 to the chassis. Manual valve 86 has an inlet 114 and an outlet 116, and port 100 is connected through its check valve via a line 118 to outlet 116. Inlet 114 is connected via a line 120 which tees into branch 80 which comes into the cab from tank 72. Outlet port 108 provides for connection of the trailer service brakes while outlet port 110 provides for connection of the trailer parking brakes.

The outlets of tanks 72, 74 are connected through respective check valves 122, 124 at the two inlets of a reverse tee 126 whose outlet is connected to the inlets of valves 92, 94 via a line 128. The outlet of valve 92 connects to control port 112 of TPV valve 90 while the outlet of valve 94 connects to the tractor's parking brakes. Both valves are under the control of control electronics 34.

Valve 92 controls the application of pressurized air to control port 112. When pressurized air is applied to control port 112, outlet port 108 is open through valve 90 to the three inlet ports 96, 98, 100 while outlet port 110 is open to control port 112. In this condition of valve 90, the trailer service brakes are slaved to the tractor's service brakes whereby operation of pedal valve 84 will apply both the tractor's and the trailer's service brakes. For this same condition of valve 90, operation of trailer manual brake valve 86 will operate the trailer service brakes, and the pressure conducted from control port 112 through the valve to outlet port 110 will hold the spring-operated trailer parking brakes released so that they are not applied. When pressurized air is removed from control port 112, pressure which holds the trailer spring brakes released is also removed and the springs apply the trailer parking brakes. Also associated with valve 90 is a switch 130 which operates the stop lights of the tractor and trailer when the service brakes are operated.

When valve 94 is open, tank pressure is conducted through to the tractor parking brakes to hold them released. However, when valve 94 is closed, the pneumatic pressure applied to the tractor parking brakes is exhausted, and the springs operate the tractor parking brakes.

In summary then, both valves 92, 94 are normally held open by being electrically actuated from control electronics 34, but when the control electronics ceases to actuate valve 92, it closes, exhausting the line connected to its outlet, causing the trailer parking brakes to be applied; and when the control electronics ceases to actuate valve 94, it closes, exhausting the line connected to its outlet, causing the tractor parking brakes to be applied.

Referring back to FIG. 1, one will see that there are two control devices 132, 134 associated with the control electronics. Also associated with the control electronics is an electric pressure transducer 136 disposed to sense the pressure of compressed air in the pneumatic power supply. The pressure transducer is mounted on tank 40 to sense the pressure of air inside the tank.

The two devices are part of the parking brake control. Both are of an electro-mechanical construction and are virtually identical. Device 132 is designated PARK and device 134 TRAILER. When the driver desires to operate the trailer parking brakes only, he activates device 134. When he desires to operate the tractor parking brakes, he activates device 132. If a trailer is coupled to the tractor, the activation of device 132 will also cause the trailer parking brakes to be applied without the necessity of the driver activating device 134.

FIG. 1 shows the two devices 132, 134 mounted on a control panel 137 for manual operation by the driver. The illustrated position shows both devices in positions operating the parking brakes of both tractor and trailer despite the redundancy created by the operation of device 134. Each device comprises an operator 138, and in the illustrated position of FIG. 1, each operator 138 has been displaced outwardly away from panel 137. When each operator is displaced inwardly toward the panel from the position illustrated in FIG. 1, it actuates an associated electrical switch assembly 140 connected with control electronics 34 and releases the parking brakes associated therewith.

The condition of each switch 140 is monitored by control electronics 34 to distinguish activation of the corresponding device from non-activation. When the switch assembly 140 of one of the devices is actuated, the control electronics energizes an electro-magnet 142 which is associated with the operator 138 of the device. The energization of the electro-magnet serves to magnetically hold the operator in the switch-actuating position despite the outward urging of the operator by an associated spring 144. In this way, once an operator has been pushed from extended position, as illustrated in FIG. 1, to switch-actuating position, it remains in that position to thereby latch the switch actuated.

The exterior end of each operator 138 comprises a knob 146 which the driver uses to push the operator toward switch-actuating position against the spring force of spring 144. That knob can also be pulled by the driver to displace the operator outwardly against the force of the electro-magnet thereby unlatching the switch. Such pulling action results in de-energization of the electro-magnet, and the outward displacement of the operator is aided by spring 144. Accordingly, once those parking brakes which are under the control of a particular device have been applied, they can be released only by pressing the corresponding operator 138 inwardly to actuate and latch the corresponding electrical switch assembly 140.

The pressure signal from transducer 136 interacts with the devices 132, 134 in a manner which will becomes more apparent from the ensuing description. For the moment it can be noted that if either switch assembly 140 of either device 132, 134 is in a latched condition, a drop in sensed air pressure below a certain threshold will unlatch the switch resulting in all parking brakes being applied. The transducer also acts via the control electronics to operate an alarm which in FIG. 1 is shown as a lamp 148 and buzzer 150 mounted on panel 137. The alarm is given when the sensed pressure drops to a certain threshold which is slightly higher than the threshold which operates the parking brakes. Hence in response to sensing the compressed air pressure in the tank apparently about to drop to an unacceptably low level, an alarm is given to the driver before the parking brakes are actually applied so that in typical situations the operator can take appropriate action before the parking brakes actually come on. The signal from the transducer is also used to control compressor loading-unloading and dryer purge cycles.

Details of device 132 are shown in FIG. 5. The operator 138 is in the form of a cylindrical plunger which is spring-loaded by spring 144. The electric switch 140 and electro-magnet 142 are supported on a framework 152 attached to the control panel. The switch is disposed in alignment with the straight line travel of the plunger and is poised for abutment by the end of the plunger opposite knob 146 when the plunger is pushed inwardly to switch-actuating position. The plunger shaft passes completely through a central circular hole in a bobbin 154 on which turns of the electro-magnet are wound. The plunger contains a suitable magnetically responsive material to be held by the electro-magnet in switch-actuating position when the electro-magnet is energized.

An alternate embodiment of device is shown in FIG. 6 and designated 156. Its plunger 158 is spring-loaded in the same fashion as plunger 138. However its electro-magnet 160 is disposed in alignment with the straight line travel of the plunger, and its electric switch assembly 162 is not coaxial with the plunger, but rather is disposed radially of the plunger axis.

The inner end of the plunger contains a magnetically responsive tip 164 for attraction by electro-magnet 160 when energized. A protrusion 166 on the sidewall of the plunger shaft serves to actuate the switch when the plunger is depressed to brake-releasing position. The protrusion is at a particular radial location on the shaft, and proper circumferential registry is obtained by a key-slot 168 in the shaft which rides in a key 170 on the panel or frame.

This embodiment may be considered to possess certain features which are conducive to lower cost manufacture than the FIG. 6 embodiment. For one, the electro-magnet can be smaller, and need not be wound on a bobbin. The operator can be molded from a suitable plastic and only the tip need be ferrous metal. The overall operation of each device of FIGS. 5 and 6 is equivalent insofar as system functioning is concerned.

Figure 4:
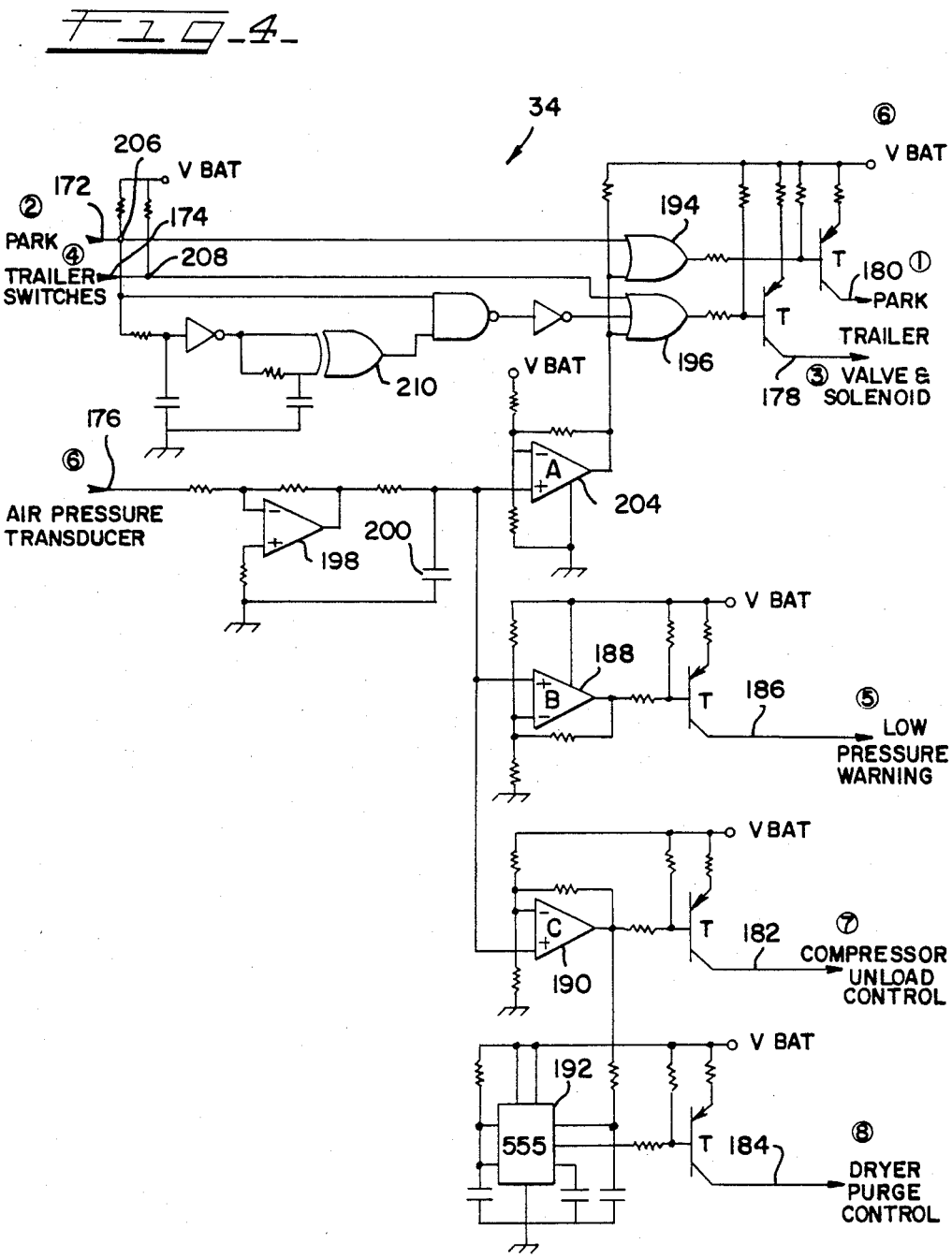
FIG. 4 is a detailed schematic diagram of another portion of the system of FIG. 1.

With the foregoing description in mind, attention can now be directed to the details of control electronics 34 shown in FIG. 4. The electronic circuitry has inputs 172, 174, 176 which are respectively connected to devices 132, 134, and transducer 136. It has outputs 178, 180 connected respectively to valves 92, 94; outputs 182, 184 connected respectively to valves 64, 70; and an output 186 connected to the alarm lamp and buzzer. Each output comprises a corresponding transistor driver, assigned the reference designation T, whose emitter is referenced to a positive supply voltage and whose collector connects to the particular device connected to the output. When a transistor is non-conductive, current does not flow to the corresponding device, but when the transistor is switched into conduction, current flows to the corresponding device.

Each transistor is under the control of an associated input circuit to the transistor. In the case of both the low pressure warning alarm transistor and the compressor unload control transistor, the associated input circuit is a corresponding comparator stage 188, 190. In the case of the dryer purge control transistor, the input circuit is a monostable type circuit 192 which is triggered from the input stage of the compressor unload control transistor input circuit. The input circuits for the park and trailer transistors which control valves 94, 92 are logic gates 194, 196.

The signal from the air pressure transducer 136 interacts with all transistor input circuits either directly or indirectly. The actual signal from the pressure transducer is first conditioned by a stage 198 including a smoothing capacitor 200 at the output of the stage which filters out high frequency components of the amplified signal to avoid spurious action due to noise or the like.

The output from stage 198 is representative of the actual sensed pressure, and is supplied as an input to stages 188, 190. The other input to each of these two stages is a corresponding reference, namely a low pressure threshold reference for the low pressure warning circuit and a compressor unload threshold reference for the compressor unload control circuit.

So long as the sensed pressure exceeds the low pressure warning threshold reference, the low pressure warning circuit does not cause an alarm to be given. However, if the sensed pressure drops below the threshold reference, the circuit activates the alarm.

So long as the sensed pressure exceeds the compressor unload pressure threshold reference, the compressor unload control circuit causes the compressor to be unloaded, but when the sensed pressure drops below the unload pressure threshold reference, the circuit causes the compressor to be loaded to re-charge the compressed air tank. Both stages 188, 190 contain a certain hysteresis so that cycling of each circuit is minimized. For example, the compressor unload control input circuit may cause loading when the pressure drops to P1 psi with unloading reoccurring only after the pressure has been restored to P1+P2 psi.

The monostable circuit 192 of the dryer purge control is triggered in response to compressor unloading. The monostable sets a timing function during which the dryer purge control circuit causes the dryer to be purged of moisture. Thereafter the circuit will allow no further purging until another purging cycle is commenced in response to the conclusion of the next compressor loading.

The signal from stage 198 is conducted to a further stage 204 which forms a logic signal which is supplied to both logic gates 194, 196. The logic signal developed by stage 204 distinguishes between sensed pressure of the pneumatic power supply being either greater than or less than a pressure below which the parking brakes should be operated.

Gates 194, 196 are OR logic gates. If the sensed pressure indicates that the parking brakes should be operated, the OR logic gates operate their respective transistors to cause the pneumatic valves 92, 94 to apply the parking brakes.

The gates 194, 196 are also under the control of the parking brake control devices 132, 134. PARK control 132 is connected in an input circuit 206 to both gates 194, 196. TRAILER control 134 is connected in an input circuit 208 to gate 196 only.

Whenever the TRAILER control device 134 commands trailer parking brake operation, gate 196 immediately acts on its transistor T.

Whenever the PARK control device 132 commands operation of the parking brakes of both tractor and trailer, gate 194 immediately causes the trailer brakes to be applied; however a delay section 210 results in slightly delayed operation of the tractor parking brakes. This is intended to insure that if a trailer is connected to the tractor, the trailer parking brakes will come on before the tractor's.

Figure 2:
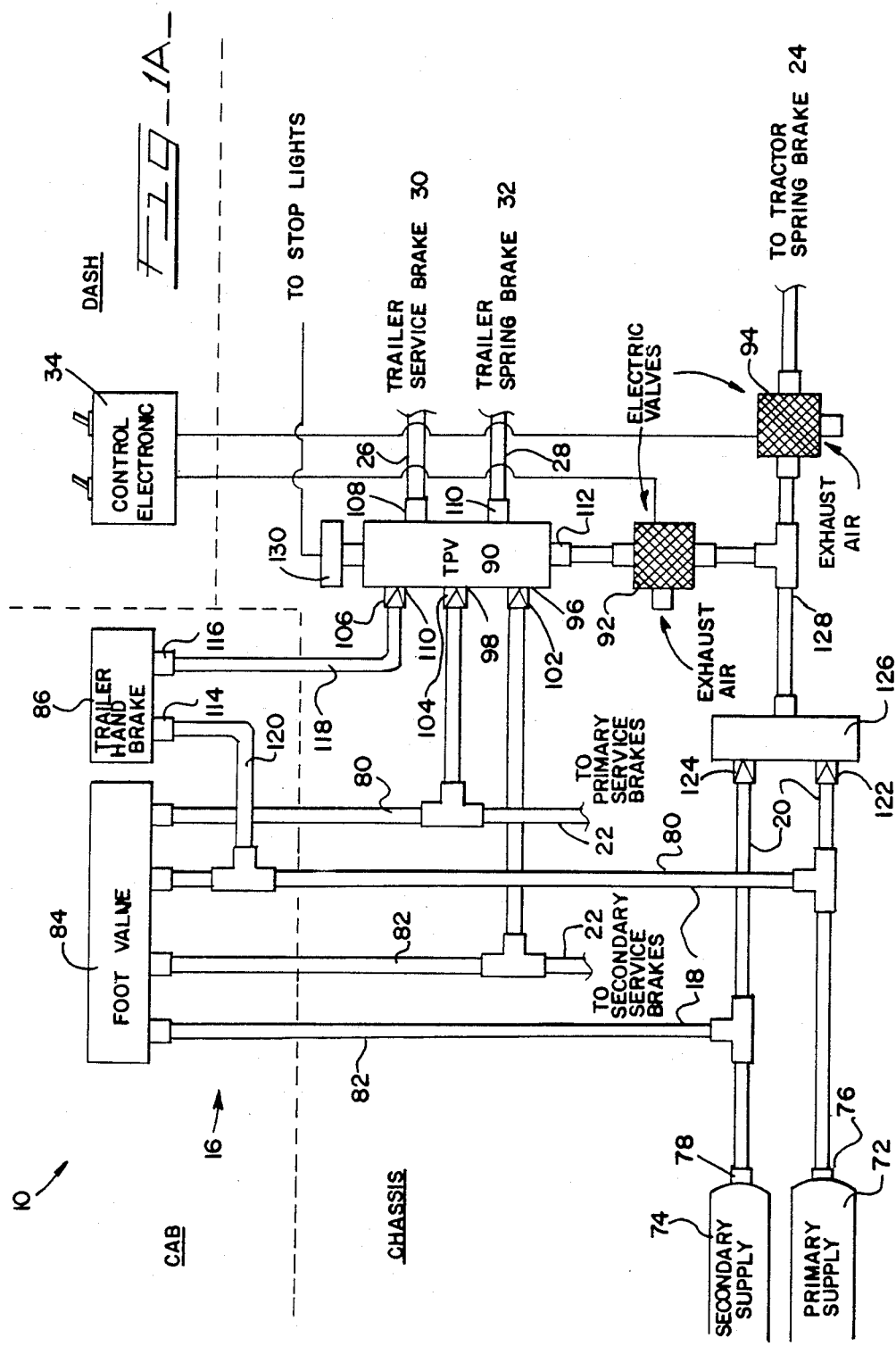
FIG. 2 is a schematic diagram illustrating a modification of a portion of the system shown in FIG. 1.
Figure 3:
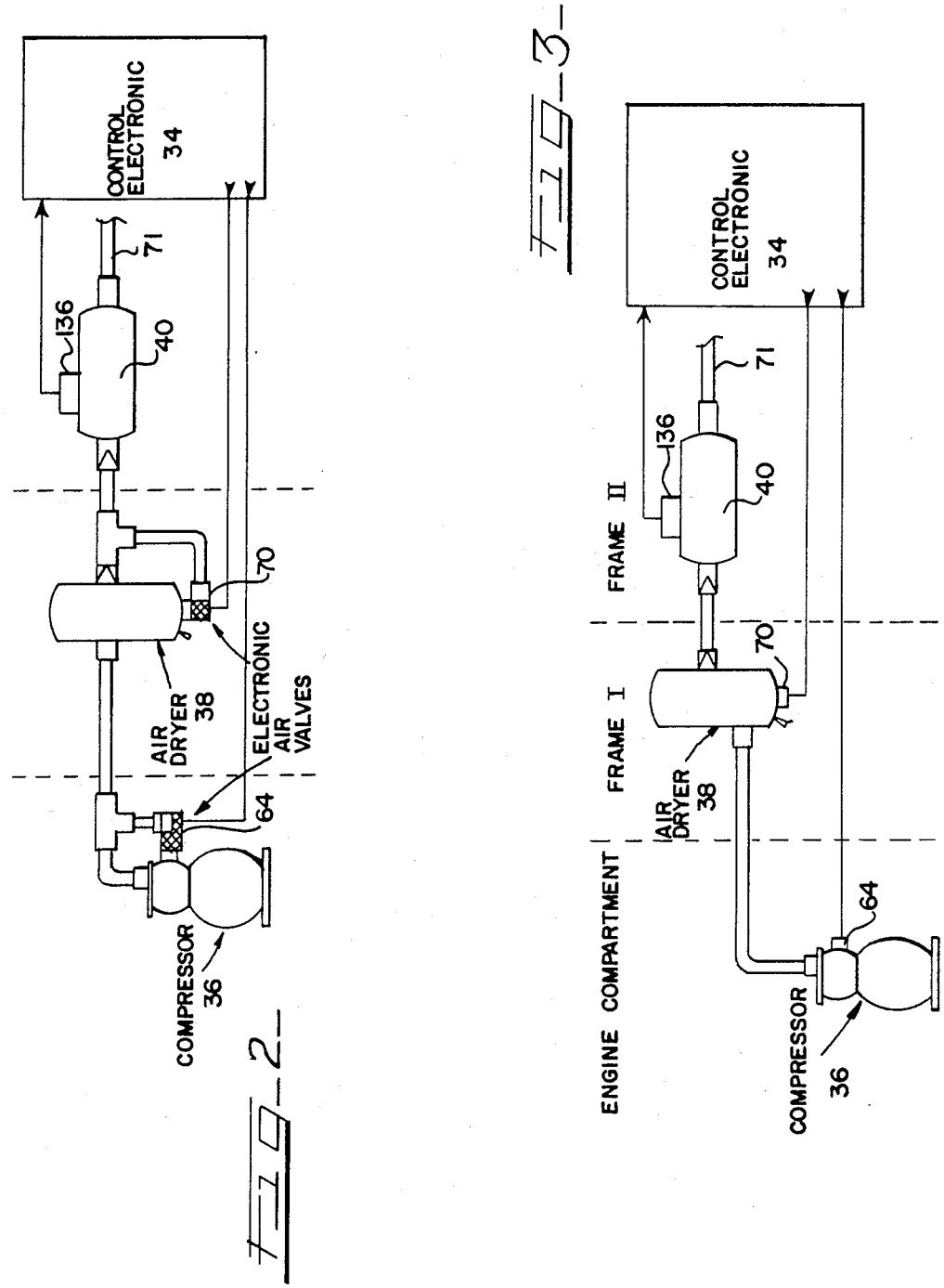
FIG. 3 is a schematic diagram illustrating a second modification.

FIGS. 2 and 3 illustrate other embodiments for compressor unloading and dryer purge control. The differences in the embodiment of FIG. 2 from the embodiment of FIG. 1 are that the two valves 64, 70 are relocated from the wet tank to the compressor and dryer. The differences in the embodiment of FIG. 3 from the embodiment of FIG. 2 are that in FIG. 2, the valves are separate assemblies, while in FIG. 3 the valves are integrated into the compressor and the dryer.

The foregoing has described a new and improved electro-pneumatic tractor-trailer brake system in its various aspects. While a preferred embodiment has been disclosed, it will be appreciated that principles of the invention can be practiced in embodiments other than those disclosed herein.

What is claimed is:

1. In an automotive tractor which comprises road-engaging wheels which are suspended from a powertrain-containing chassis to support the tractor for over-the-road travel and via at least certain of which the powertrain-containing chassis imparts automotive motion to the tractor, a cab supported on said chassis containing an interior space for a driver of the tractor, pneumatic-operated service brakes and spring-operated parking brakes for at least some of said wheels, a pneumatic power supply mounted on said chassis, a pneumatic circuit coupling said pneumatic power supply with said service and said parking brakes, said pneumatic circuit comprising one branch which extends from said pneumatic power supply, through a service brake control valve disposed for operation by the driver, to said service brakes such that operation of said service brake control valve is effective to operate said service brakes, and another branch extending from said pneumatic power supply to said parking brakes, said pneumatic circuit further comprising valve means for exercising control over pneumatic-operated service and spring-operated parking brakes for road-engaging wheels of a trailer when such a trailer is coupled to said tractor for hauling and also over said parking brakes of said tractor, means coupling said valve means with said one branch such that the operation of the service brakes of such a trailer is slaved to the operation of said service brakes of said tractor via said valve means, and means coupling said valve means with said another branch such that the operation of said parking brakes of said tractor and of the parking brakes of such a trailer is effected via said valve means from a control which is on the interior of the cab and which is accessible to a driver for selective operation of said parking brakes of said tractor and the parking brakes of such a trailer, the improvement which comprises said valve means being mounted on said chassis external to the interior space of said cab, and said control on the interior of the cab comprising an electrical control for selectively operating said parking brakes of said tractor and the parking brakes of such a trailer, said electrical control comprising electrical command means for operation by the driver, electrical circuitry coupling said electrical command means to said valve means, said valve means including an electric-actuated valve means portion to which said electrical circuitry is connected such that said electric-actuated valve means portion is under the control of said electrical command means, in which said electrical command means comprises two separate command devices, one for controlling the operating of solely the parking brakes of such a trailer and the other for controlling the operation of both the parking brakes of such a trailer and said parking brakes of said tractor.

2. The improvement set forth in claim 1 in which said electric-actuated valve means portion comprises two separate electric-actuated pneumatic valves under the control of said two separate command devices such that said one of said two separate command devices controls only one of said two separate electric-actuated pneumatic valves but said other of said two separate command devices controls both said two separate electric-actuated pneumatic valves.

3. The improvement set forth in claim 2 in which the other of said two separate electric-actuated pneumatic valves is connected in series pneumatic circuit relationship with said parking brakes of said tractor.

4. The improvement set forth in claim 2 in which said valve means comprises a multi-port pneumatic valve through which the service and parking brakes of such a trailer are connected with said pneumatic circuit.

5. The improvement set forth in claim 4 in which said multi-port pneumatic valve comprises a control port to which said one electric-actuated pneumatic valve is connected, said multi-port pneumatic valve comprising means for causing the parking brakes of such a trailer to be operated in response to a pneumatic control signal applied to said control port through said one electric-actuated pneumatic valve.

6. The improvement set forth in claim 1 in which each of said command devices is an electro-mechanical device which comprises a spring-biased operator, a switch, and an electro-magnet organized and arranged to bias the operator away from actuation of the switch, but in response to activation of the operator by the driver against the spring bias, to cause the switch to be actuated by the operator and to be held actuated against the spring bias so long as the pressure of the pneumatic power supply, as sensed by a pressure transducer associated with the pneumatic power supply, exceeds a certain threshold, but when the pressure of the pneumatic power supply drops below that certain minimum, the spring bias is effective to move the operator away from actuation of the switch, each said switch, when actuated, not commanding parking brake operation.

7. The improvement set forth in claim 6 in which said electrical circuitry comprises an electronic circuit coupling said electro-mechanical devices with the parking brakes of such a trailer and said parking brakes of said tractor, said electronic circuit comprising an input which receives from said pressure transducer a signal representative of the pressure of said pneumatic power supply, said electronic circuit comprising further inputs which respectively receive respective signals from the respective switches of said electro-mechanical devices, said electronic circuit comprising outputs coupled to said parking brakes of said tractor and for coupling to the parking brakes of such a trailer, said outputs having respective connections for operating the respective electro-magnets of said devices in response to actuation of the respective switches of said devices to latch the switches actuated, the signal from said pressure transducer being effective via said electronic circuit to unlatch said electro-magnets when the pressure of said pneumatic supply drops below that certain threshold, and said operators being operable by the driver for mechanically unlatching the respective switches of said devices at any time.

8. The improvement set forth in claim 7 in which said electronic circuit comprises means for causing the respective switches to be unlatched in a predetermined sequence in response to the operation of said other of said devices and thereby cause said parking brakes of said tractor and the parking brakes of such a trailer to be sequentially operated to cause the parking brakes of such a trailer to be operated before said parking brakes of said tractor are operated.

9. The improvement set forth in claim 7 in which said electronic circuit includes a further output for regulating the pressure of said pneumatic power supply in accordance with the pressure sensed by said pressure transducer, said pneumatic power supply comprising a compressor which is selectively loaded and unloaded, and when loaded, operates to draw and compress air into a tank which forms a reservoir of compressed air for powering said pneumatic circuit, said electronic circuit comprising means effective via said further output to control loading and unloading of said compressor in accordance with pressure sensed by said pressure transducer such that said compressor is operated to maintain certain pressure conditions in said tank.

10. The improvement set forth in claim 9 in which said electronic circuit comprises means effective via a still further output for purging condensed moisture from a dryer connected in pneumatic circuit relationship with said compressor and said tank, said last-mentioned means of said electronic circuit comprises means effective in response to unloading of said compressor to initiate a limited time purging of the dryer in accordance with a timing function set by said electronic control circuit.

11. The improvement set forth in claim 1 further including a pneumatic control valve disposed in said cab for operation by the driver for use in exercising control over the service brakes of such a trailer alone without exercising any accompanying control over the operation of said service brakes of said tractor.

12. The improvement set forth in claim 1 in which said parking brakes of said tractor and the parking brakes of such a trailer comprise means for causing spring-operation to occur in response to the pressure of said pneumatic power supply dropping below a certain threshold.

13. The improvement set forth in claim 12 including a pressure transducer associated with said pneumatic power supply for sensing the pneumatic power supply pressure and an electronic circuit having an input which is connected to said pressure transducer, said electronic circuit comprising means for giving an alarm to the driver when the sensed pressure in said pneumatic power supply drops below a threshold which is above said certain threshold.

14. In an automotive tractor which comprises road-engaging wheels which are suspended from a powertrain-containing chassis to support the tractor for over-the-road travel and via at least certain of which the powertrain-containing chassis imparts automotive motion to the tractor, pneumatic-operated service brakes and spring-operated parking brakes for at least some of said wheels, a pneumatic power supply, a pneumatic circuit coupling said pneumatic power supply with said service brakes and parking brakes, said pneumatic circuit comprising one branch which extends from said pneumatic power supply, through a service brake control valve disposed for operation by the driver, to said service brakes such that operation of said service brake control valve is effective to operate said service brakes, and another branch extending from said pneumatic power supply to said parking brakes, said pneumatic circuit further comprising valve means for exercising control over pneumatic-operated service and spring-operated parking brakes for road-engaging wheels of a trailer when such a trailer is coupled to said tractor for hauling by said tractor and also over said parking brakes of said tractor, means coupling said valve means with said one branch such that the operation of the service brakes of such a trailer is slaved to the operation of said service brakes of said tractor via said valve means, and means coupling said valve means with said another branch such that the operation of said parking brakes of said tractor and the parking brakes of such a trailer is effected via said valve means from a control which is accessible to the driver for selective operation of said parking brakes of said tractor and the parking brakes of such a trailer, said valve means comprising a multi-port pneumatic valve through which the service and parking brakes of such a trailer are connected with said pneumatic circuit, said multi-port pneumatic valve comprising a control port to which a pneumatic control signal is applied for controlling operation of said multi-port pneumatic valve, the improvement which comprises said control comprising an electrical control for selectively operating said parking brakes of said tractor and the parking brakes of such a trailer, said electrical control comprising electrical command means for operation by the driver, electrical circuitry coupling said electrical command means to said valve means, said valve means including an electric-actuated valve means portion to which said electrical circuitry is connected such that said electric-actuated valve means portion is under the control of said electrical command means, said electric-actuated valve means portion being coupled with said control port of said multi-port pneumatic valve for controlling the application of the pneumatic control signal to said control port, said multi-port pneumatic valve comprising means for causing the parking brakes of such a trailer to be operated in response to the application of the pneumatic control signal to said control port by said electric-actuated valve means portion.

15. The improvement set forth in claim 14 in Which said electric-actuated valve means portion comprises two separate electric-actuated pneumatic valves under the control of said electrical command means such that one of said two separate electric-actuated pneumatic valves controls the application of the pneumatic control signal to said control port of said multi-port pneumatic valve, and the other of said two separate electric-actuated pneumatic valves controls the operation of said parking brakes of said tractor.

16. The improvement set forth in claim 15 in which said electrical command means comprises two command devices, one for operating only the parking brakes of such a trailer, the other for operating both the parking brakes of such a trailer and said parking brakes of said tractor, said electrical circuitry comprising an electronic control circuit which is under the control of said two command devices and has respective outputs connected to respective ones of said two separate electric-actuated pneumatic valves, said electronic control circuit comprising means for causing the pneumatic control signal to be applied to said control port whenever either command device is operated to thereby cause the parking brakes of such a trailer to be operated but causing said other of said two separate electric-actuated pneumatic valves to be operated to cause said parking brakes of said tractor to be operated only when a particular one of said two command devices is operated.

17. The improvement set forth in claim 16 in which each of said two command devices is an electro-mechanical device which comprises a spring-biased operator, a switch, and an electro-magnet organized and arranged to bias the operator away from actuation of the switch, but in response to activation of the operator by the driver against the spring bias, to cause the switch to be actuated by the operator and to be held actuated against the spring bias so long as the pressure of the pneumatic power supply, as sensed by a pressure transducer associated with the pneumatic power supply, exceeds a certain minimum but when the pressure of the pneumatic power supply drops below that certain minimum the spring bias is effective to move the operator away from actuation of the switch, said switches, when actuated, not commanding parking brake operation, said electronic circuit comprising an input which receives a signal from said pressure transducer representative of the pressure of said pneumatic power supply, said electronic circuit comprising further inputs which respectively receive respective signals from the respective switches of said electro-mechanical command devices, said electronic circuit comprising respective outputs coupled to said two separate electric-actuated pneumatic valves.

18. The improvement set forth in claim 18 in which said outputs have respective connections for operating the respective electro-magnets of said devices in response to actuation of the respective switches of said devices to latch the switches actuated, the signal from said pressure transducer being effective via said electronic circuit to unlatch said electro-magnets when the pressure of said pneumatic supply drops below that certain minimum, said operators being operable by the driver for mechanically unlatching the respective switches of said devices at any time, and said electronic circuit comprises means for causing the respective switches to be unlatched in a predetermined sequence in response to the operation of said other of said devices and cause the parking brakes of such a trailer and said parking brakes of said tractor to be sequentially operated to cause the parking brakes of such a trailer to be operated before said brakes of said tractor are operated.

19. The improvement set forth in claim 14 in which said tractor comprises a cab for the driver and said multi-port pneumatic valve is disposed on the tractor chassis exterior of said cab.

20. In an automotive tractor which comprises road-engaging wheels which are suspended from a powertrain-containing chassis to support the tractor for over-the-road travel and via at least certain of which the powertrain-containing chassis imparts automotive motion to the tractor, pneumatic-operated service brakes and spring-operated parking brakes for at least some of said wheels, a pneumatic power supply, a pneumatic circuit coupling said pneumatic power supply with said service and said parking brakes, said pneumatic circuit comprising one branch which extends from said pneumatic power supply, through a service brake control valve disposed for operating by a driver of the tractor, to said service brakes such that operation of said service brake control valve is effective to operate said service brakes, and another branch extending from said pneumatic power supply to said parking brakes, and a control which is accessible to the driver for operating said parking brakes, the improvement which comprises said control comprising a pressure transducer sensing pressure of compressed air in said pneumatic power supply and providing a sensed pressure signal, an electrical control device accessible to the driver for providing a command signal to command operation of said parking brakes, and an electronic control circuit comprising respective inputs which receive the respective signals from said pressure transducer and said control device and an output which is coupled to said parking brakes and via which control of said parking brakes is exercised, said electronic control circuit comprising means for causing said parking brakes to be operated when the command signal is given by said device, and means for causing said parking brakes to be operated when the sensed pressure signal drops below a certain threshold, in which said parking brakes are coupled to said pneumatic power supply through an electric-actuated pneumatic valve which has an electrical control input connected to said output of said electronic circuit and is operated by said electronic control circuit to open and closed conditions to selectively conduct compressed air from said pneumatic power supply to said parking brakes, said parking brakes operating when said electric-actuated pneumatic valve is closed, in which said electrical control device is an electro-mechanical device which comprises an electric switch which provides the command signal calling for parking brake operation when the switch is not actuated, a spring-biased operator, and an electro-magnet and which is organized and arranged to bias the operator away from actuation of the switch thereby biasing the operator toward commanding parking brake operation, but in response to activation of the operator by the driver, to cause the switch to be actuated by the operator and to be held actuated by said electro-magnet against the spring bias so long as the sensed pressure signal exceeds that certain threshold, but when the sensed pressure signal from said pressure transducer drops below that certain threshold, the spring bias is effective to move the operator away from actuation of the switch and call for parking brake operation.

21. The improvement set forth in claim 20 in which said electronic control circuit couples said switch and electro-magnet such that in response to actuation of said switch by said operator, said switch is latched actuated by said electronic control circuit operating said electro-magnet, and the sensed pressure signal is effective via said electronic control circuit to unlatch said switch when the sensed pressure signal drops below that certain minimum, and said operator being operable by the driver for mechanically unlatching said switch at any time.

22. In a tractor-trailer combination wherein the trailer comprises road-engaging wheels, and the tractor comprises road-engaging wheels which are suspended from a powertrain-containing chassis to support the tractor for over-the-road travel and via at least certain of which the powertrain-containing chassis imparts automotive motion to the tractor, pneumatic-operated service brakes and spring-operated parking brakes for at least some of the wheels of the tractor-trailer combination, a pneumatic power supply, a pneumatic circuit coupling said pneumatic power supply with said service and said parking brakes, said pneumatic circuit comprising one branch which extends from said pneumatic power supply, through a service brake control valve disposed for operation by a driver of the tractor to said service brakes such that operation of said service brake control valve is effective to operate said service brakes, and another branch extending from said pneumatic power supply to said parking brakes, and a control which is accessible to the driver for operating said parking brakes, the improvement which comprises said control comprising a pressure transducer sensing pressure of compressed air in said pneumatic power supply and providing a sensed pressure signal, an electrical control device accessible to the driver for providing a command signal to command operation of said parking brakes, and an electronic control circuit comprising respective inputs which receive the respective signals from said pressure transducer and said control device and an output which is coupled to said parking brakes and via which control of said parking brakes is exercised, said electronic control circuit comprising means for causing said parking brakes to be operated when the command signal is given by said device, and means for causing said parking brakes to be operated when the sensed pressure signal drops below a certain threshold, in which said parking brakes are coupled to said pneumatic power supply through electric-actuated pneumatic valve means connected to said output of said electronic circuit and operated by said electronic control circuit to selectively conduct compressed air from said pneumatic power supply to said parking brakes, said parking brakes operating when said electric-actuated pneumatic valve means is not conducting compressed air from said pneumatic power supply to said parking brakes, in which said electrical control device comprises an electro-mechanical device which comprises an electric switch which provides the command signal calling for parking brake operation when the switch is not actuated, a spring-biased operator, and an electro-magnet and which is organized and arranged to bias the operator away from actuation of the switch thereby biasing the operator toward commanding parking brake operation, but in response to activation of the operator by the driver, to cause the switch to be actuated by the operator and to be held actuated by said electro-magnet against the spring bias so long as the sensed pressure signal exceeds that certain threshold, but when the sensed pressure signal from said pressure transducer drops below that certain threshold, the spring bias is effective to move the operator away from actuation of the switch and thereby call for parking brake operation, and said electronic control circuit couples said switch and electro-magnet such that in response to actuation of said switch by said operator, said switch is latched actuated by said electronic control circuit operating said electro-magnet, and the sensed pressure signal is effective via said electronic control circuit to unlatch said switch when the sensed pressure signal drops below that certain threshold, and said operator being operable by the driver for mechanically unlatching said switch at any time.

23. In a tractor-trailer combination wherein the trailer comprises road-engaging wheels, and the tractor comprises road-engaging wheels which are suspended from a powertrain-containing chassis to support the tractor for over-the-road travel and via at least certain of which the powertrain-containing chassis imparts automotive motion to the tractor, pneumatic-operated service brakes and spring-operated parking brakes for at least some of the wheels of the tractor-trailer combination, a pneumatic power supply, a pneumatic circuit coupling said pneumatic power supply with said service and said parking brakes, said pneumatic circuit comprising one branch which extends from said pneumatic power supply, through a service brake control valve disposed for operation by a driver of the tractor to said service brakes such that operation of said service brake control valve is effective to operate said service brakes, and another branch extending from said pneumatic power supply to said parking brakes, and a control which is accessible to the driver for operating said parking brakes, the improvement which comprises said control comprising a pressure transducer sensing pressure of compressed air in said pneumatic power supply and providing a sensed pressure signal, an electrical control device accessible to the driver for providing a command signal to command operation of said parking brakes, and an electronic control circuit comprising respective inputs which receive the respective signals from said pressure transducer and said control device and an output which is coupled to said parking brakes and via which control of said parking brakes is exercised, said electronic control circuit comprising means for causing said parking brakes to be operated when the command signal is given by said device, and means for causing said parking brakes to be operated when the sensed pressure signal drops below a certain threshold, in which said parking brakes are coupled to said pneumatic power supply through electric-actuated pneumatic valve means connected to said output of said electronic circuit and operated by said electronic control circuit to selectively conduct compressed air from said pneumatic power supply to said parking brakes, said parking brakes operating when said electric-actuated pneumatic valve means is not conducting compressed air from said pneumatic power supply to said parking brakes, in which at least one wheel of said tractor has such a parking brake and at least one wheel of said trailer has such a parking brake and such a service brake, and said control comprises two such control devices, one for controlling the operation of solely the parking brakes of said at least one trailer wheel and the other for controlling the operation of the parking brakes of both said at least one trailer wheel and of said at least one tractor wheel, and said electric-actuated pneumatic valve means comprises two separate electric-actuated pneumatic valves under the control of said two separate control devices such that said one of said two separate control devices controls only one of said two separate electric-actuated pneumatic valves but said other of said two separate control devices controls both said two separate electric-actuated pneumatic valves.

24. The improvement set forth in claim 23 in which each of said control devices is an electro-mechanical control device which comprises a spring-biased operator, a switch, and an electro-magnet organized and arranged to bias the operator away from actuation of the switch thereby biasing the operator toward commanding parking brake operation, but in response to activation of the operator by the driver, to cause the switch to be actuated by the operator and to be held actuated against the spring bias so long as the pressure of the pneumatic power supply, as sensed by a pressure transducer associated with the pneumatic power supply, exceeds a certain threshold, but when the pressure of the pneumatic power supply drops below that certain threshold, the spring bias is effective to move the operator away from actuation of the switch, said electronic circuit comprising an input which receives a signal from said pressure transducer, said signal being representative of the pressure of said pneumatic power supply, said electronic circuit comprising further inputs which respectively receive respective signals from the respective switches of said electro-mechanical control devices, said electronic circuit comprising outputs coupled to said parking brakes of said tractor and for coupling to the parking brakes of such a trailer, said outputs having respective connections for operating the respective electro-magnets of said devices in response to actuation of the respective switches of said devices to latch the switches actuated, the signal from said pressure transducer being effective via said electronic circuit to unlatch said electro-magnets when the pressure of said pneumatic supply drops below that certain threshold, and said operators being operable by the driver for mechanically unlatching the respective switches of said devices at any time.

25. The improvement set forth in claim 24 in which said parking brakes comprise pneumatic-released, spring-activated brakes in which a spring activates a brake in response to the pressure of said pneumatic power supply dropping below that certain threshold, and said electronic circuit comprising means for giving an alarm to the driver when the sensed pressure in said pneumatic power supply drops below a threshold which is above that certain threshold.

26. In an automotive tractor which comprises road-engaging wheels which are suspended from a power-train-containing chassis to support the tractor for over-the-road travel and via at least certain of which the powertrain-containing chassis imparts automotive motion to the tractor, said tractor having service and parking brake systems including means providing for connection of service and parking brake systems for road-engaging wheels of a trailer with said tractor's service and parking brake systems when such a trailer is coupled to said tractor for hauling, said tractor comprising a service brake operator disposed for actuation by a driver of the tractor to operate the service brake systems of both said tractor and such a trailer, and parking brake operator means disposed for actuation by the driver to operate the parking brake systems of both said tractor and such a trailer, the improvement which comprises said parking brake operator means comprising a member which is arranged for displacement between first and second positions, an electric circuit element coacting with said member to distinguish between said member being in its first position and said member being in its second position, an electric circuit in which said electric circuit element is electrically connected, said electric circuit comprising means for giving a signal for commanding operation of at least one of the parking brake systems to apply it parking brakes when said electric circuit element indicates that said member is in other than its second position, a further electric circuit element which is disposed for coaction with said member, and which acts, via said electric circuit, to hold said member in its second position in response to the first-mentioned electric circuit element's indication that said member is in its second position, and means providing for the driver to override the holding action of said further electric circuit element on said member and cause said member to be displaced from its second position.

27. The improvement set forth in claim 26 in which said member comprises a plunger which is resiliently biased in the direction from its second position toward its first position, and said means providing for the driver to override the holding action of said further electric circuit element on said member and cause said member to be displaced from its second position comprises a knob for manual grasping by the driver.

28. The improvement set forth in claim 27 in which said first-mentioned electric circuit element is disposed along side the path of displacement of said plunger, and said further electric circuit element is disposed in alignment with the path of displacement of said plunger.

29. The improvement set forth in claim 28 in which said first-mentioned electric circuit element is an electric switch assembly and said further electric circuit element is an electro-magnet.

30. The improvement set forth in claim 29 in which said knob is disposed on said plunger at one end thereof and the opposite end of said plunger comprises a magnetically responsive tip, said electro-magnet being energized when said electric switch assembly indicates that said plunger is in its second position thereby holding said member in its second position by magnetic force acting on said magnetically responsive tip.

31. The improvement set forth in claim 30 in which said plunger is arranged to be displaced between its first and second positions along a straight axis and to be constrained against rotary displacement about that axis.

32. The improvement set forth in claim 26 in which said means for giving a signal for commanding operation of at least one of the parking brake systems when said electric circuit element indicates that said member is in other than its second position commands operation of only the parking brake system of such a trailer, said parking brake operator means comprises another member which is arranged for displacement between its own first and second positions, another electric circuit element coacting with said another member to distinguish between said another member being in its first position and said another member being in its second position, said another electric circuit element is electrically connected in said electric circuit, a still further electric circuit element which is disposed for coaction with said another member, and which acts, via said electric circuit, to hold said another member in its second position in response to said another electric circuit element's indication that said another member is in its second position, said electric circuit comprising means for giving another command signal to command operation of the parking brake systems of both said tractor and such a trailer when said another electric circuit element indicates that said another member is in other than its second position, and means providing for the driver to override the holding action of said still further electric circuit element on said another member, and said electric circuit comprising means for giving another command signal to command operation of the parking brake systems of both said tractor and such a trailer when said another electric circuit element indicates that said another member is in other than its second position.

33. The improvement set forth in claim 32 in which said electric circuit comprises sequencing means for issuing said another command signal such that the operation of the parking brake system of such a trailer is called for before the operation of said tractor parking brake system is called for.

34. The improvement set forth in claim 33 in which such parking brake systems comprise pneumatic-released, spring-operated parking brakes, said tractor comprises a pneumatic power supply which is coupled with said pneumatic-released, spring-operated parking brakes via such parking brake systems, a pressure transducer which senses the pressure of said pneumatic power supply and provides a pressure signal to said electric circuit, said electric circuit comprises means for interrupting the holding action of said further and said still further electric circuit elements on said first-mentioned and said another members respectively in response to the pressure signal from said pressure transducer indicating a drop in pressure below a certain threshold.

35. The improvement set forth in claim 31 in which such parking brake systems comprise pneumatic-released, spring-operated parking brakes, said tractor comprises a pneumatic power supply which is coupled with the pneumatic-released, spring-operated parking brakes via such parking brake systems, a pressure transducer which senses the pressure of said pneumatic power supply and provides a pressure signal to said electric circuit, said electric circuit comprises means for interrupting the holding action of said electric circuit element on said member in response to the pressure signal from said pressure transducer indicating a drop in pressure below a certain threshold.

* * * * *